United States Patent [19]

Rogerson

[11] Patent Number: 5,316,810
[45] Date of Patent: May 31, 1994

[54] POLYMERIC STRUCTURE SECURED TO DISSIMILAR COMPONENTS

[76] Inventor: L. Keith Rogerson, No. 9 Fourth Ave., Isle of Palms, S.C. 29451

[21] Appl. No.: 794,991

[22] Filed: Nov. 19, 1991

[51] Int. Cl.⁵ ............................................. B29D 22/00
[52] U.S. Cl. ................................. 428/35.7; 428/167; 428/412; 428/461; 428/420; 428/516
[58] Field of Search .............. 428/412, 461, 516, 35.7, 428/167, 420

[56] References Cited

U.S. PATENT DOCUMENTS

| | | | |
|---|---|---|---|
| 3,914,521 | 10/1975 | Beatty et al. | 428/463 |
| 4,472,231 | 9/1984 | Jenkins | 428/420 |
| 5,096,775 | 3/1992 | Sato et al. | 428/442 |
| 5,205,895 | 4/1993 | Hohman, Jr. et al. | 428/420 |

Primary Examiner—P. C. Sluby
Attorney, Agent, or Firm—Dority & Manning

[57] ABSTRACT

An article of manufacture in which a polymeric structure is bonded to a component of dissimilar material through a polymeric interface material. The polymeric interface material may be a polyolefin having functional monomers grafted thereto, and the component of dissimilar material may be metallic. Further, an improved method of producing an article of manufacture including the steps of heating a component of dissimilar material, placing it in contact with a polymeric interface material for coating and then affixing the coated component of dissimilar material to a polymeric structure.

12 Claims, 2 Drawing Sheets

5,316,810

POLYMERIC STRUCTURE SECURED TO DISSIMILAR COMPONENTS

BACKGROUND OF THE INVENTION

The present invention relates generally to an improved article and method of manufacture, and more particularly to a polymeric structure with components of dissimilar material bonded thereto through an interface material and a method thereof.

When making polymeric structures, it is often desirable to incorporate components of dissimilar material for a variety of reasons. For example, it may be desirable to incorporate metallic insert structures, which inserts may be used for support, to thread additional elements into, or for other reasons. In addition, it may be desirable to firmly affix components of dissimilar materials such as metal to a polymeric article to provide enhanced structural integrity of the finished product or provide for additional assembly to the polymeric structure.

Heretofore, it has been difficult to obtain a suitable and sufficiently strong connection between a polymeric material and a dissimilar material such as a metal insert or support. If the connection between these elements is not sufficiently strong, it presents a weakness in the finished article.

SUMMARY OF THE INVENTION

The present invention recognizes and addresses the foregoing disadvantages, and others of prior art constructions and methods.

Accordingly, it is an object of the present invention to provide an improved article of manufacture with components of dissimilar material affixed or molded thereto.

It is another object of the present invention to provide an improved polymeric article with inserts securely affixed or molded thereon.

It is another object of the present invention to provide an article of manufacture in which metallic components are securely affixed to a polymeric structure.

Still another object of the present invention is to provide an improved method of producing an article of manufacture.

Another object of the present invention is to provide a method of producing an article of manufacture that has components of dissimilar material securely affixed or molded thereto.

It is another object of the present invention to provide an improved method for securing inserts to a polymeric structure.

Yet another object of the present invention to provide an improved process for securing structural components to a polymeric structure.

These and other objects are achieved by providing an improved article of manufacture, the article comprising a polymeric structure. The polymeric structure includes at least one component of material dissimilar to the polymeric structure. The component of dissimilar material has a polymeric interface material located between the component and the polymer of the structure and being bonded to both so that the at least one component of dissimilar material is securely affixed to the polymeric structure through the interface material. In a preferred embodiment, the polymeric material may be a polyolefin having functional monomers grafted thereto and the component of dissimilar material may be metallic.

These and other objects may also be achieved by providing an improved method of producing an article of manufacture, the method including the step of providing a polymeric interface material, the polymeric interface material being capable of bonding to a component of material dissimilar to the material to be utilized to make a polymeric structure of the article of manufacture. The method also including the step of heating a component of dissimilar material to a temperature above the reactive temperature of the polymeric interface material. The method including the further step of placing the component of dissimilar material in contact with the polymeric interface material while the temperature of the component of dissimilar material is above the reactive temperature of the polymeric interface material so that the polymeric interface material will coat and bond to at least a portion of the component of dissimilar material, and thereafter affixing the component of dissimilar material to a polymeric structure so that the polymeric interface material bonds to the polymeric structure at an elevated temperature so that the component of dissimilar material is securely affixed to the polymeric structure through the polymeric interface material.

The bond between the polymeric interface material and the component of dissimilar material may be chemical, and the polymeric interface material may be a polyolefin having functional monomers grafted thereto. Further, the step of affixing the component of dissimilar material to the polymeric structure may include the step of molding the component of dissimilar material into the polymeric structure so that the polymeric structure bonds to the polymeric interface material and securely affixes the component of dissimilar material to the polymeric structure. The component of dissimilar material may be metallic and the polymeric structure may be polypropylene or polyethylene or the like so long as it will bond to the interfacial material.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which.

Figure 1:
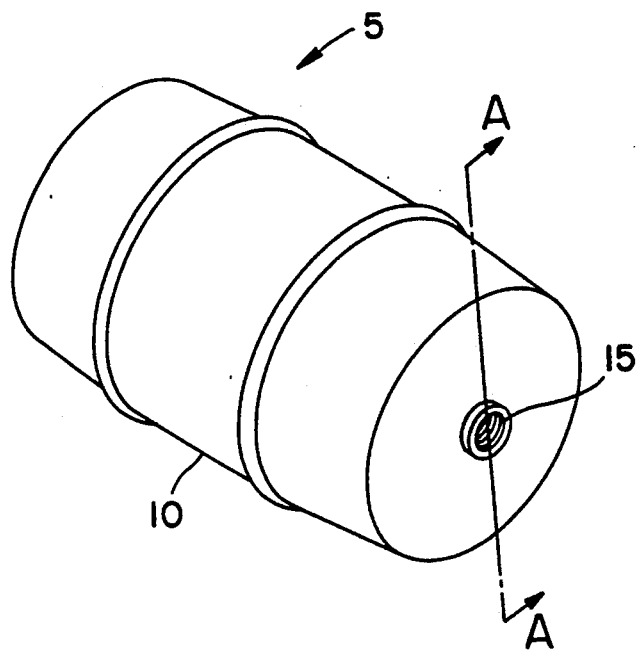
FIG. 1 is a perspective view of an embodiment of the article of manufacture of the present invention.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary construction. Referring to FIG. 1, an improved article of manufacture in accordance with one embodiment of the present invention is illustrated generally at 5. The improved article of manufacture includes a polymeric structure 10 and at least one component of material 15 dissimilar to the polymeric structure. As illustrated in FIG. 1, the article of manufacture is embodied as a barrel 10 with an insert 15 of dissimilar material. Component of dissimilar material 15 may include internal threads 20 to facilitate attachment of the component of dissimilar material 15 to additional elements such as, for example, a valve. While illustrated as a barrel or tank in FIGS. 1 and 2, it should be understood that this is by way of illustration only and the polymeric structure could be any polymeric structure such as, for example, a computer housing, an instrument case, a telephone or a boat.

In a preferred embodiment, the component of dissimilar material 15 is a metallic component such as a threaded insert, a spacer, or a structural element. For example, component of dissimilar material 15 may be stainless steel, brass, aluminum, zinc alloys, or other alloys or polymers. It should be understood that component of dissimilar material 15 includes any material that is not the same as the material utilized in the polymeric structure. This would also include polymers that are dissimilar to the particular polymers used to make polymeric structure 10.

Figure 2:
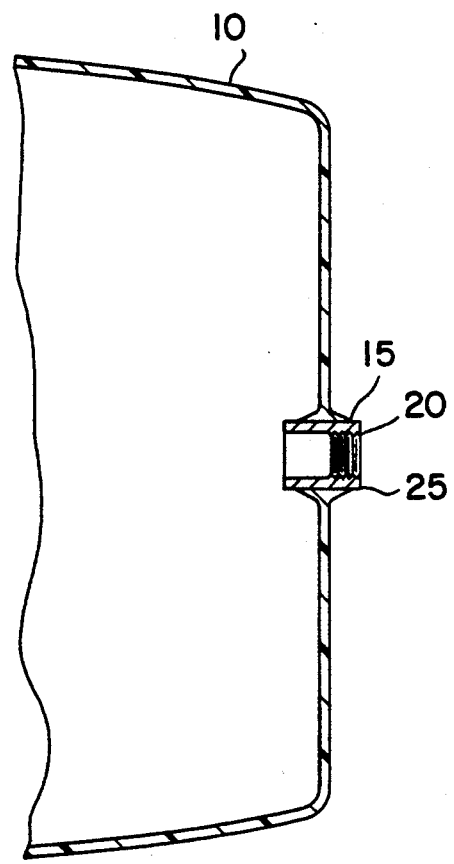
FIG. 2 is a cross-section of FIG. 1 taken along line A—A.
Figure 3:
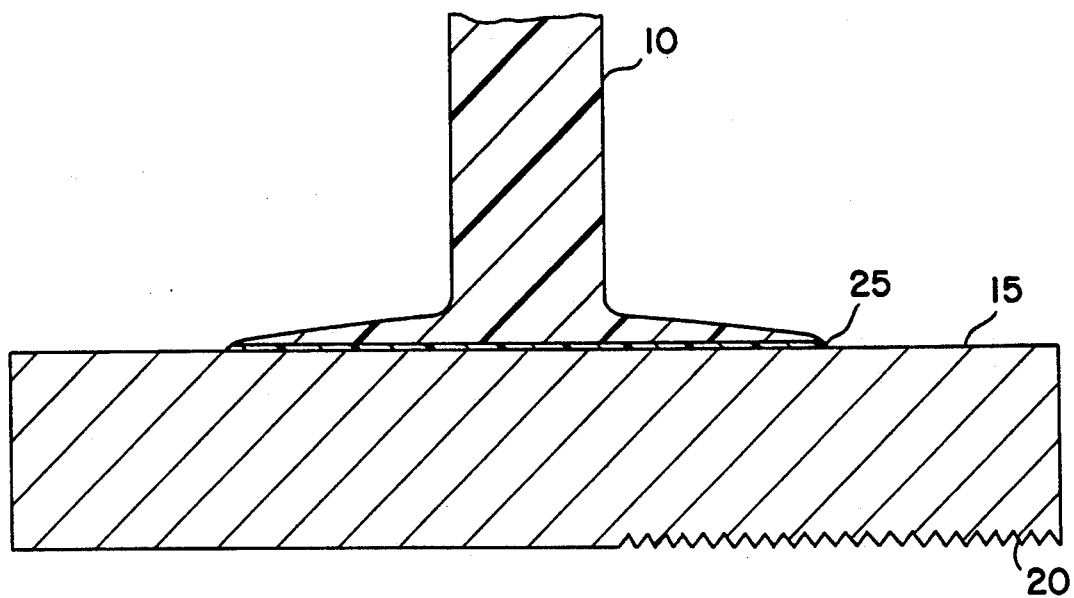
FIG. 3 is an enlarged view of the connection between the polymeric structure and the component of dissimilar material of FIG. 2.

As best illustrated in FIGS. 2 and 3, a polymeric interface material 25 is located between polymeric structure 10 and component of dissimilar material 15. Polymeric interface material 25 bonds polymeric structure 10 to component of dissimilar material 15 so as to securely affix component of dissimilar material 15 to polymeric structure 10.

Polymeric structure 10 may be any suitable type of polymer such as, for example, polypropylene, polyethylene, acrylonitrile butadience-styrene, polycarbonate, etc.

Figure 4:
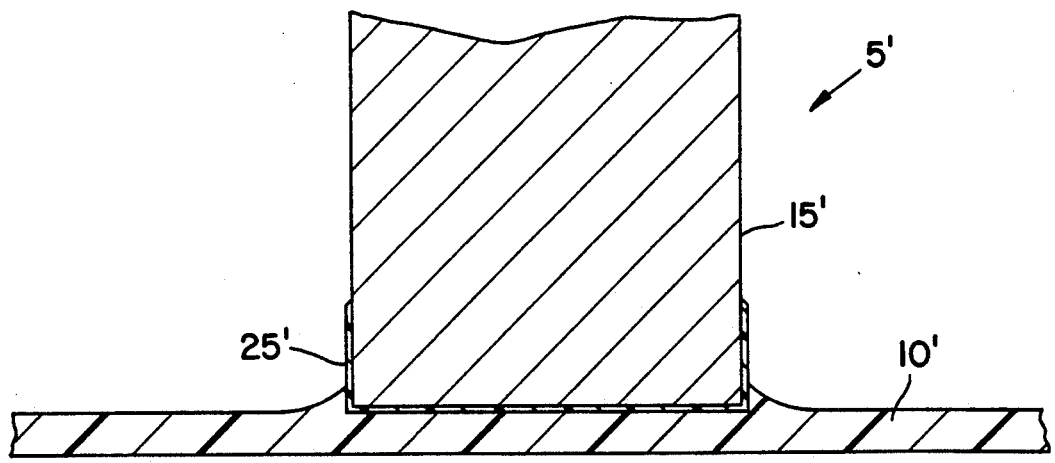
FIG. 4 is an enlarged view of another embodiment of the present invention.

FIG. 4 illustrates another embodiment of an article of manufacture in accordance with the present invention generally at 5'. In the embodiment of FIG. 4, a polymeric structure 10' is provided adhered to a component of dissimilar material 15'through a polymeric interface material 25'. As set forth above, the polymeric structure 10' may be any suitable polymer such as polyethylene or polypropylene, and the component of dissimilar material 15' may be any metallic or non-metallic component that is not the same as the polymer utilized for polymeric structure 10'. FIG. 4 illustrates a pre-existing polymeric structure 10' adhered to the component of dissimilar material 15', whereas FIG. 1 illustrates a polymeric structure 10 that was molded around the component of dissimilar material 15. In the embodiment of FIG. 1, the bonding between the polymeric structure and the polymeric interface material occurs during the formation of the polymeric structure, i.e., such as during the molding process.

The polymeric interface material according to the present invention is preferably produced from polymeric materials that bond to the component of dissimilar material. In fact, the bond achieved is believed to be chemical in nature for attempts to separate same occur across the polymer itself instead of at the polymer-dissimilar material interface.

Polymers suitable as the interface material according to the present invention are polyolefins having functional monomers grafted thereto. Such polymeric materials when brought into contact with the dissimilar component surface, heated to a temperature between the melting point of the polymeric interface material and its degradation temperature, will in a predetermined period of time provide a coating on the surface of the component of dissimilar material that is bonded thereto.

The polyolefins may be in homopolymer or copolymer form, such as polyethylenes, polypropylenes, ethylene vinyl acetate and the like, and the functional monomers are exemplified by acrylic acid, methacrylic acid, maleic anhydride and the like. Suitable exemplary commercial polymeric materials suitable for use according to the present invention are the POLYBOND products manufactured by BP Performance Polymers, Inc. and the PLEXAR products manufactured by Quantum Chemical Corporation.

Also in accordance with the present invention, an improved method of producing an article of manufacture such as disclosed above is set forth herein. The process includes the steps of providing a polymeric interface material such as 25 in FIG. 3. The polymeric interface material 25 is capable of bonding to a component of dissimilar material such as 15 in FIG. 3 and to the polymeric article of manufacture. In a preferred embodiment, the polymeric interface material is a polyolefin having functional monomers grafted thereto as set forth and described above.

The process also includes the step of heating a component of dissimilar material such as 15 to a temperature above the reactive temperature of the polymeric interface material 25. Of course, the reactive temperature will vary depending on the particular polymeric interface material as would be readily apparent to one skilled in the art. The method further includes the step of placing the component of dissimilar material 15 in contact with the polymeric interface material 25 while the temperature of the component of dissimilar material is still above the reactive temperature of the polymeric interface material 25 so that the polymeric interface material 25 will coat and bond to at least a portion of the component of dissimilar material. This is preferably accomplished while the temperature of the component of dissimilar material is falling, but is still above the reactive temperature of the polymeric interface material.

The process further includes the step of affixing component of dissimilar material 25 to a polymeric structure 10 so that the polymeric interface material 25 bonds to the polymeric structure so that the component of dissimilar material 15 is securely affixed to the polymeric structure through the polymeric interface material.

In a preferred embodiment, the component of dissimilar material is metallic such as, for example, stainless steel, brass, aluminum, zinc alloys or other alloys. In addition, the component of dissimilar material may comprise a polymeric component that is different than the polymeric utilized for the polymeric structure. If the component of dissimilar material is metallic, it is preferred that prior to bonding, a low pH be maintained on the surface to be bonded to. Preparation may be by sandblasting or acid wash.

The step of affixing the component of dissimilar material 15 to polymeric structure 10 may include the step of molding the component of dissimilar material into the polymeric structure so that the polymeric structure bonds to the polymeric interface material and securely affixes the component of dissimilar material to the polymeric structure. Any known suitable molding process could be utilized in this step such as, for example, rotational molding, injection molding, or the like.

Alternatively, the step of affixing the component of dissimilar material 25 to polymeric structure 10 may include the step of placing the component of dissimilar material 15 that has been coated with the polymeric interface material 25 in contact with a preexisting polymeric structure while the component of dissimilar material is of a sufficiently elevated temperature to cause the polymeric structure to bond to the polymeric interface material to secure the component of dissimilar material to the polymeric structure.

The article and method of the present invention may be better understood by reference to the following examples.

Example 1

A stainless steel internally threaded insert was heated to approximately 450°F. A teflon plug was placed in the insert to prevent the threads from being coated. The insert was then placed in a fluidized bed of PLEXAR 232, a low density polyethylene with a functional monomer grafted thereto. The fluidized bed was maintained with ambient air and the PLEXAR 232 was in powder form. It was intended that the insert would reach the fluidized bed and begin to be coated when it was approximately 425°F. The insert was maintained in the fluidized bed for approximately 5 seconds and then taken out and allowed to cool. It was observed during the cooling phase that the polymeric coating went from a flat black appearance to a shiny black appearance and then to a dull black appearance when cooled to ambient temperature. The teflon plug was removed and the excess PLEXAR was trimmed away. The insert was then placed in a conventional rotational mold. The rotational mold was charged with polymer and a tank was rotomolded about the insert with the insert being molded as part of the tank.

Example 2

An aluminum bar was heated to 450°F. and then, as its temperature was falling, it was placed in a tray of PLEXAR 232 in powder form. The bar was placed in the tray when the bar was at approximately 425°F. As the PLEXAR 232 melted and coated a portion of the aluminum bar, the bar was removed and placed in contact with a sheet of polyethylene. Since the melting point of the polyethylene sheet was approximately 275°F., the bar was above that temperature at contact so there would be bonding between the interface material and the polymeric structure. The polyethylene sheet securely bonded to the aluminum bar through the PLEXAR 232.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

WHAT IS CLAIMED IS:

1. An improved article of manufacture, said article comprising:

a) a metallic component;
   b) a polymeric structure formed about said metallic component; and
   c) an interface material located between said metallic component and said polymeric structure wherein said interface material consists essentially of a polymer chemically bonded to said metallic component so that said interface material affixedly connects said metallic component to said polymeric structure.

2. The improved article as defined in claim 1 wherein said polymer is a polyolefin having functional monomers grafted thereto.

3. The improved article as defined in claim 1 wherein said polymeric structure comprises a polymeric structural material chosen from the group consisting of polypropylene, polyethylene, acrylonitrile butadience-styrene, and polycarbonate.

4. The improved article as defined in claim 1 wherein said polymeric structure is formed by rotomolding a polymeric structural material about said metallic component.

5. The improved article as defined in claim 1 wherein said metallic component is chosen from the group consisting of an insert, a threaded insert, and a spacer.

6. The improved article as defined in claim 1 wherein said metallic component comprises a metal chosen from the group consisting of stainless steel, brass, aluminum, and zinc alloys.

7. An improved article of manufacture, said article comprising:

a metallic component formed within a polymeric structure wherein said polymeric structure and said metallic component are bonded together by an interface material consisting essentially of a polymer chemically bonded to both of said metallic component and said polymeric structure.

8. The improved article as defined in claim 7 wherein said interface material comprises a polyolefin having functional monomers grafted thereto.

9. The improved article as defined in claim 7 wherein said polymeric structure is rotomolded about said metallic component and chemically bonded to said metallic component through an interface material comprising a polyolefin having functional monomers grafted thereto.

10. The improved article manufacture as defined in claim 7 wherein said metallic component comprises an insert threaded to receive a threaded component therewithin.

11. An improved article of manufacture comprising a metallic insert coated with an interface material consisting essentially of polyolefin having functional monomers grafted thereto wherein said interface material is chemically bonded to said insert, said article further comprising a polymeric structure molded about said insert with said interface material coated thereon so that said polymeric structure is chemically bonded to said insert through said interface material.

12. A polymeric barrel molded about a metallic insert wherein said metallic insert is threaded for receiving a threaded component therewithin, said metallic insert being coated with an interface material consisting essentially of a polyolefin having functional monomers grafted thereto and wherein said coated insert is chemically bonded to said barrel polymeric barrel molded thereabout through said interface material.

* * * * *